United States Patent
Elwell et al.

(10) Patent No.: US 9,783,258 B1
(45) Date of Patent: Oct. 10, 2017

(54) MOTORCYCLE CLUTCH HOLDING DEVICE

(71) Applicant: David Ott, Ankeny, IA (US)

(72) Inventors: James P. Elwell, Grimes, IA (US); David Ott, Ankeny, IA (US); Diane Ott, Des Moines, IA (US); Trent Quick, Des Moines, IA (US); John Wagner, Des Moines, IA (US); Paul Thomas Adair, Des Moines, IA (US)

(73) Assignee: David Ott, Ankeny, IA (US)

( * ) Notice: Subject to any disclaimer, the term of this patent is extended or adjusted under 35 U.S.C. 154(b) by 0 days.

(21) Appl. No.: 15/422,712

(22) Filed: Feb. 2, 2017

Related U.S. Application Data

(60) Provisional application No. 62/363,564, filed on Jul. 18, 2016.

(51) Int. Cl.
  *B62K 21/12* (2006.01)
  *B62K 11/14* (2006.01)
  *B62K 23/06* (2006.01)

(52) U.S. Cl.
  CPC .............. *B62K 11/14* (2013.01); *B62K 23/06* (2013.01)

(58) Field of Classification Search
  CPC ........ B62K 11/14; B62K 23/00; B62K 23/02; B62K 23/06; G05G 1/04; G05G 5/06; H01H 2009/068; F16D 23/12; B60Y 2200/12; B60K 23/02
  See application file for complete search history.

(56) References Cited

U.S. PATENT DOCUMENTS

| | | | |
|---|---|---|---|
| 2,149,262 A | 3/1939 | Ahler | |
| 3,335,621 A | 8/1967 | Buchwald | |
| 3,720,111 A | 3/1973 | Guyton | |
| 3,733,922 A | 5/1973 | Tripp | |
| 3,856,123 A | 12/1974 | Kinsey | |
| 3,896,680 A | 7/1975 | Shoemaker | |
| 4,316,531 A | 2/1982 | Harpster | |
| 4,364,283 A * | 12/1982 | Ricardo | ............ F02D 11/02 403/324 |
| 4,704,044 A | 11/1987 | Yoshigai | |

(Continued)

FOREIGN PATENT DOCUMENTS

CN 101074708 A 11/2007
EP 0764574 A1 3/1997

*Primary Examiner* — Adam D Rogers
(74) *Attorney, Agent, or Firm* — McKee, Voorhees & Sease, PLC

(57) ABSTRACT

On a motorized vehicle with handlebars and handlebar mounted levers, a device includes a collar or clamp on which a thumb lever and catch slide in a groove to a desired position and are restrained by a notch, detent, slot, or other disruption in the groove to retain a handlebar lever in a desired position. Preferably, the thumb and catch are biased toward a disengaged position by a spring, by gravity, or by electro mechanical means. Spacers, additions, and handlebar extensions can all be provided with the device to allow for installation on a variety of handlebar sizes. In another embodiment, the thumb lever pivots about an axis generally perpendicular from the handlebar axis between a disengaged positon where the catch is clear from the clutch or brake lever and an engaged position where the catch engages the clutch or brake lever and holds it in a retracted position.

19 Claims, 18 Drawing Sheets

(56) References Cited

U.S. PATENT DOCUMENTS

| | | | | |
|---|---|---|---|---|
| 5,775,167 | A * | 7/1998 | Maietta | B62K 11/14 |
| | | | | 74/480 R |
| 6,389,928 | B1 | 5/2002 | Kobayashi et al. | |
| 6,945,376 | B1 | 9/2005 | Hunter | |
| 7,219,573 | B2 * | 5/2007 | Dal Pra' | B62K 23/06 |
| | | | | 74/502.2 |
| 7,600,447 | B2 | 10/2009 | Burner et al. | |
| 7,735,392 | B2 * | 6/2010 | Poulos, Jr. | B62K 23/04 |
| | | | | 74/502.2 |
| 7,992,690 | B2 | 8/2011 | Cross | |
| 8,096,921 | B2 | 1/2012 | Hahn | |
| 8,201,476 | B2 * | 6/2012 | Tsumiyama | B60T 7/102 |
| | | | | 74/502.2 |
| 8,505,673 | B2 * | 8/2013 | Bowers | B62K 11/14 |
| | | | | 180/19.3 |
| 9,056,649 | B2 | 6/2015 | Gohr et al. | |
| 9,284,011 | B2 | 3/2016 | Aguilar | |
| 9,381,971 | B2 * | 7/2016 | Miki | B62K 23/06 |
| 9,511,815 | B2 * | 12/2016 | Hirotomi | B62K 23/06 |
| 2006/0071542 | A1 | 4/2006 | Lichtensteiger et al. | |
| 2007/0151395 | A1 * | 7/2007 | Barnett | B62K 11/14 |
| | | | | 74/502.2 |
| 2008/0047768 | A1 | 2/2008 | Cross | |
| 2008/0098848 | A1 * | 5/2008 | Dal Pra' | B62K 23/06 |
| | | | | 74/502.2 |
| 2009/0139823 | A1 | 6/2009 | Dyer | |
| 2010/0307856 | A1 | 12/2010 | Hahn | |
| 2013/0069355 | A1 | 3/2013 | Gohr et al. | |
| 2015/0020638 | A1 | 1/2015 | Oakes et al. | |
| 2015/0284046 | A1 | 10/2015 | Aguilar | |

* cited by examiner

MOTORCYCLE CLUTCH HOLDING DEVICE

CROSS REFERENCE TO RELATED APPLICATIONS

Present application claims priority to U.S. Provisional Patent Application Ser. No. 62/363,564, filed on Jul. 18, 2016 and entitled CLUTCH ASSISTANCE. The entire contents of this patent application are hereby expressly incorporated herein by reference including, without limitation, the specification, claims, and abstract, as well as any figures, tables, or drawings thereof.

FIELD OF THE INVENTION

The present invention is directed to an apparatus, and method to restrain clutch and brake levers in a desired position. Preferably, the present invention is intended for use on motorcycles, four wheelers, three wheelers, and other motorized vehicles on which clutch and brake levers are standard equipment.

BACKGROUND OF THE INVENTION

Motorcycles, motorized tricycles, three wheelers and four wheelers are examples of motorized vehicles that typically use handlebar mounted clutch and brake mechanisms. Typically, a rider will pull a lever towards the handlebar to either disengage the clutch or to engage a brake. Both the clutch and the brake levers are typically biased towards an extended position, with lever located further from the handlebar. To disengage the clutch, the clutch lever must be pulled in towards the handlebar. Similarly, to engage the brake, the brake lever must be pulled in towards the handlebar. During travel, a rider may wish to have the clutch disengaged and/or the brake engaged for a lengthy period of time. For example, at a stop light, a motorcycle rider can either down shift to neutral, requiring an upshift to first gear prior to departure. However, this option is undesirable as the rider must shift the weight of the motorcycle onto their right foot while simultaneously pulling the clutch lever in and shifting into first gear before the motorcycle can start moving again. This weight shifting, clutch pulling and gear shifting process is time consuming and causes a delay before the motorcycle can begin accelerating again.

This can cause a substantial safety issue, especially when the motorcycle is sitting at a stop light that just turned green and traffic is bearing down on the motorcycle from behind. In addition, this weight shifting, clutch pulling and gear shifting process is a balancing act that requires substantial adeptness and skill. If performed improperly the motorcycle can fall over injuring the rider and any passenger not to mention causing damage to the motorcycle. This process is made substantially more complicated when a passenger is on board because if they shift their weight while the rider only has one foot on the ground this can cause the motorcycle to tip over.

As an alternative, the rider can down shift into first gear and maintain the clutch in a disengaged position. This allows the rider to have full use of their left foot during the wait time. That is, while the rider is waiting the motorcycle is in first gear and is ready to start moving as soon as the clutch lever is released. This allows the rider use of their left foot for balancing the motorcycle while waiting. Obviating the need to shift into first gear allows the rider to start moving faster. Doing so requires the rider to maintain pressure on the desired lever, which, over lengthy periods of time can cause strain in the rider's hand. In order to provide the rider some relief during long periods of rest, it is desirable to have a device which can restrain either the clutch lever or the brake lever, as desired, and provide rest to the rider's hands.

Others have attempted to provide a solution to the fatigue problem presented above. However, each of these prior art devices suffer from various disadvantages such as being overly complex, failing to be convenient to use, failing to be usable with various devices, being bulky, being expensive, being unattractive, requiring implementation at the factory, among countless other deficiencies. For example, Chinese Patent No. 101074708 A, which was published on Nov. 21, 2007, discloses a complicated automatic control system that requires a processing unit, a wide variety of sensors, and alteration to the clutch mechanism itself.

Others have also tried similarly complicated devices, as shown in U.S. Pat. No. 3,896,680 to Mr. Shoemaker, which issued on Jul. 29, 1975, and U.S. Pat. No. 4,316,531, which issued to Mr. Harpster on Feb. 23, 1982. Both of these systems restrain the clutch lever through significant modification to the clutch lever and its related hardware. These systems must either be professionally installed or require the rider to disassemble, modify, and reassemble the clutch lever on their motorcycle, which can present significant issues. It is therefore desirable to have a clutch and/or brake lever retention device that is easy to install and easy to use and that does not require modification of the clutch or brake levers themselves.

U.S. Patent Application Publication No. US 2009/0139823 A1 to Dyer, which was published on Jun. 4, 2009, attempts to address some of these problems. The Dyer application discloses a clutch lever assist mechanism that does not require modification to the clutch or brake levers. However, the Dyer publication presents many other problems. One example of the device in the Dyer publication's problems is that the Dyer publication device rotates about a fixed pivot point that is both parallel to the handlebar axis and is above the handlebar in order to restrain the clutch lever from above. This arrangement relies on the lever to apply a force to keep the restraint in place.

Removing the restraint in the Dyer publication requires a rider to pull back on the clutch lever, but the Dyer publication device restrains the clutch lever directly against the handlebar making release of the device difficult. Finally, the Dyer publication device includes a selective locking mechanism that rotates into place and allows the rider to lock the clutch lever in a disengaged position. If the lock mechanism gets stuck or breaks, the Dyer publication device can unintentionally restrain the clutch lever in a disengaged position when not desired. It is there for desirable to have a clutch and brake restrain device that includes a variety of safety structures to ensure usability of the motorcycle is not impaired.

Accordingly, it is an objective of the claimed invention to overcome one or more of the problems of the prior art and to improve on the state of the art.

Another object of the present invention is a lever restraint device which does not require modification of a clutch of brake lever.

Another object of the present invention is a lever restraint device which does not require significant tooling for installation.

Another object of the present invention is a lever restraint device which can be easily installed by the rider.

Another object of the present invention is a lever restraint device which is easy to use.

Another object of the present invention is a lever restraint device which provides a variety of safety features to ensure the rider is able to engage and disengage the restraining device when desired.

Yet another object of the invention is to provide a clutch assistance system and method of use that reduces or eliminates the wait time needed to shift gears.

Another object of the invention is to provide a clutch assistance system and method of use that has a robust design.

Yet another object of the invention is to provide a clutch assistance system and method of use that improves the efficiency of riding.

Another object of the invention is to provide a clutch assistance system and method of use that can be used on a wide variety of motorcycles and power sport systems.

Yet another object of the invention is to provide a clutch assistance system and method of use that has a long useful life.

Another object of the invention is to provide a clutch assistance system and method of use that has a small footprint.

Yet another object of the invention is to provide a clutch assistance system and method of use that is high quality.

Another object of the invention is to provide a clutch assistance system and method of use that is durable.

Another object of the invention is to provide a clutch assistance system and method of use that can be installed on practically any motorcycle or other power sport vehicle.

Another object of the present invention is a lever restraint device which includes a variety of safety features that will not interfere with the normal operation of the motorcycle.

These and other objects, features, or advantages of the present invention will become apparent from the following specification, figures, and claims.

BRIEF SUMMARY OF THE INVENTION

The present invention preferably includes a lever assistance system that helps to hold the clutch in a retracted or disengaged position when an operator is sitting at an idle position. The system is preferably compatible with practically any motorcycle or other power sport device that has a lever activated clutch and may be sold as part of a kit that includes a variety of handlebar and lever adapters, spacers, or inserts. The system preferably includes a collar or clamp that fits around the grip or handle bar and includes a thumb lever connected to a lever catch.

In one embodiment, the thumb lever and catch slide in a groove to a desired position. In the desired position, the thumb lever and catch are restrained by a notch, detent, slot, or other disruption in the groove. Preferably, the thumb and catch are biased toward a disengaged position by a spring, by gravity, or by electro mechanical means, such as a servo, a motor and gear assembly, magnetics, or any other desired electro mechanical apparatus to move the slider from a first position to a second position.

In another embodiment, the thumb lever pivots between a disengaged positon where the lever catch is clear from the clutch or brake lever and an engaged position where the lever catch engages the clutch or brake lever and holds it in a retracted position.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION OF THE INVENTION

The following definitions and introductory matters are provided to facilitate an understanding of the present invention.

Numeric ranges recited within the specification, including ranges of "greater than," "at least," or "less than" a numeric value, are inclusive of the numbers defining the range and include each integer within the defined range.

The singular terms "a", "an", and "the" include plural referents unless context clearly indicates otherwise. Similarly, the word "or" is intended to include "and" unless the context clearly indicate otherwise. The word "or" means any one member of a particular list and also includes any combination of members of that list.

Figure 1:
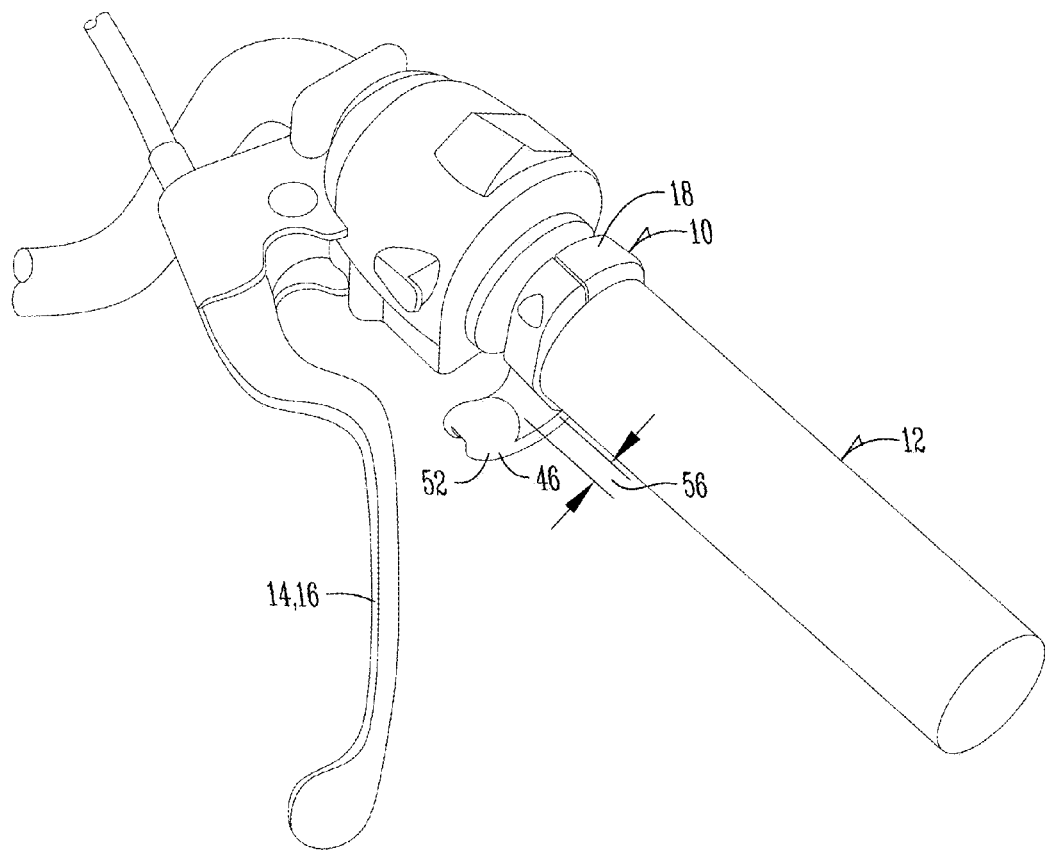
FIG. 1 shows a perspective view of the restraining device in first position where is it not engaging the clutch or brake lever.
Figure 2:
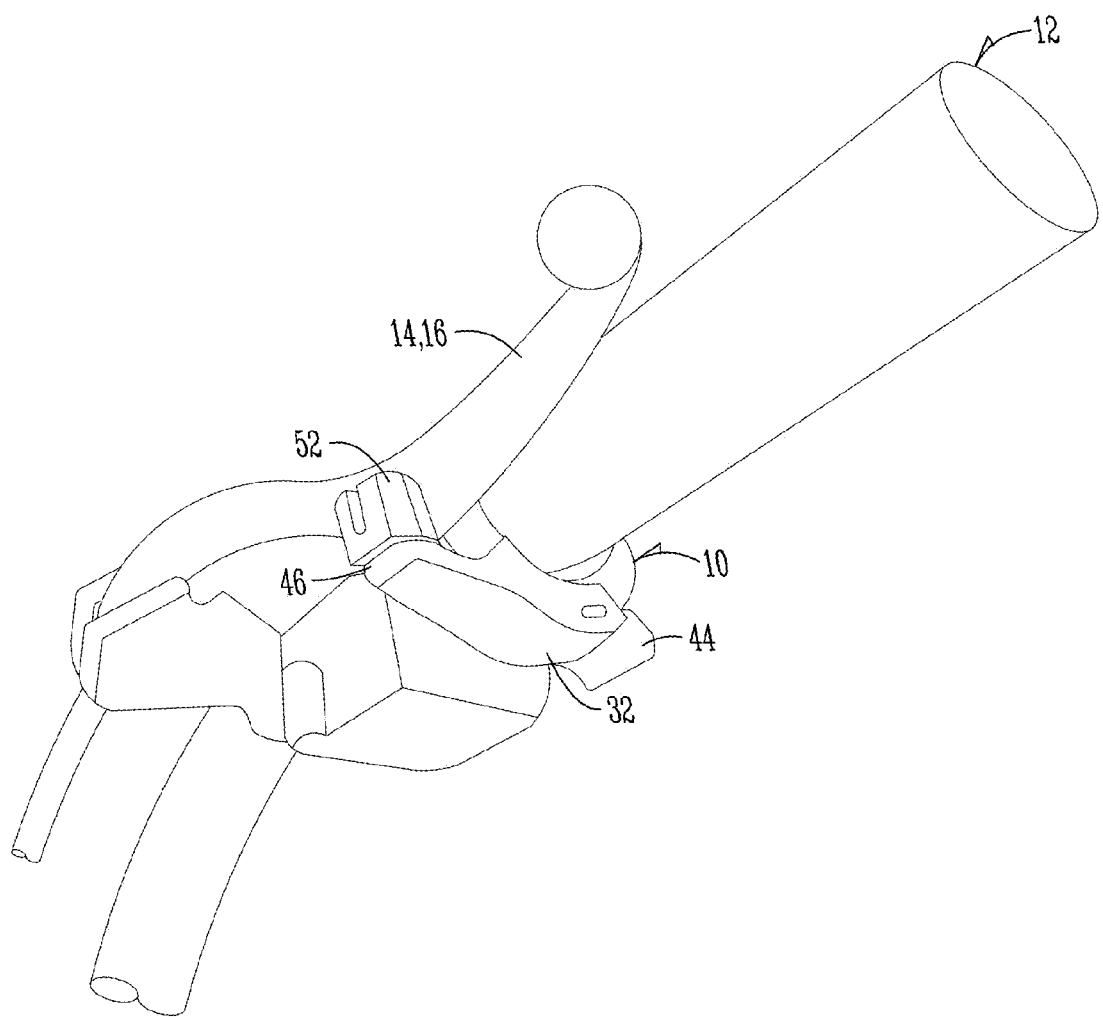
FIG. 2 shows a lower perspective view of restraining device engaging the clutch or brake lever.

One example of the present invention is shown in FIGS. 1 and 2. This example will be described as being used on a motorcycle, but it is to be understood that the present invention can be employed on a variety of vehicles with handlebars and associated levers. A motorcycle typically has a clutch/brake lever 14/16 on a handlebar 12. The clutch/brake lever 14/16 is typically biased away from the handlebar 12. Away from the handlebar 12, in a released position, the brake lever 16 is disengaged while the clutch lever 14 is engaged. When pulled towards the handlebar 12 in a retracted position, the brake lever 16 is engaged, causing the motorcycle to brake and when pressure is maintained on the brake lever 16, the motorcycle remains in a braked condition.

Similarly, but conversely, when the clutch lever 14 is away from the handlebar 12 in a released position, the clutch is engaged, allowing the motor to engage the transmission and ultimately turn a wheel. When the clutch lever 14 is pulled towards the handlebar 12 in a retracted position, the clutch is disengaged, allowing the rider to shift gears on the motorcycle. Maintaining the clutch lever 14 in a disengaged position allows the rider to keep the motorcycle in first gear while resting, thus being prepared for departure without a need to shift out of a neutral position, making for a quicker departure.

The present invention maintains the clutch/brake lever 14/16 in a retracted position, allowing a rider to release the rider's grip on the clutch/brake lever 14/16, while the clutch/brake lever 14/16 remains in a retracted position. To accomplish this, this embodiment of the present invention includes a clamp 18 secured to a motorcycle handlebar 12. The clamp 18 surrounds the handlebar 12 and is preferably pressure fit around the handlebar 12.

Figure 3:
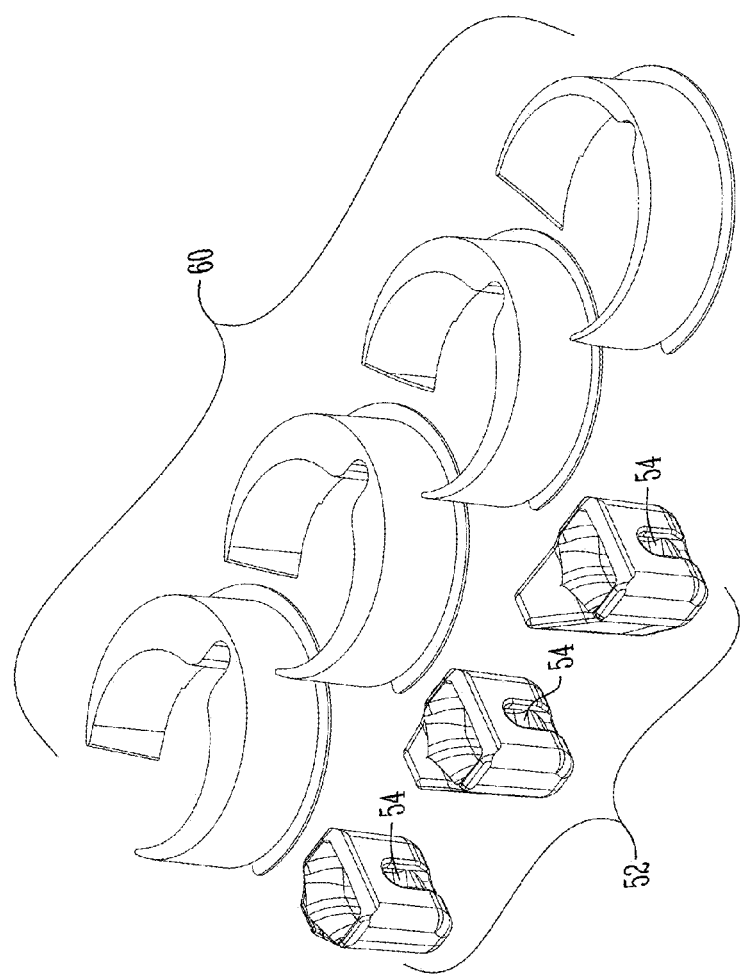
FIG. 3 shows a perspective view of the restraining device kit.
Figure 3:
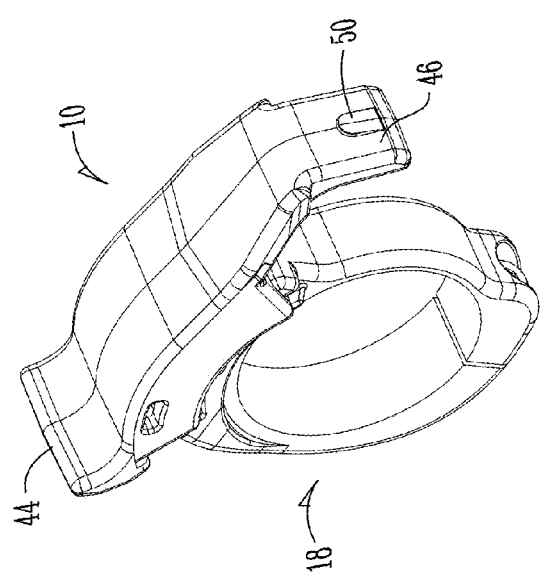
Figure 13:
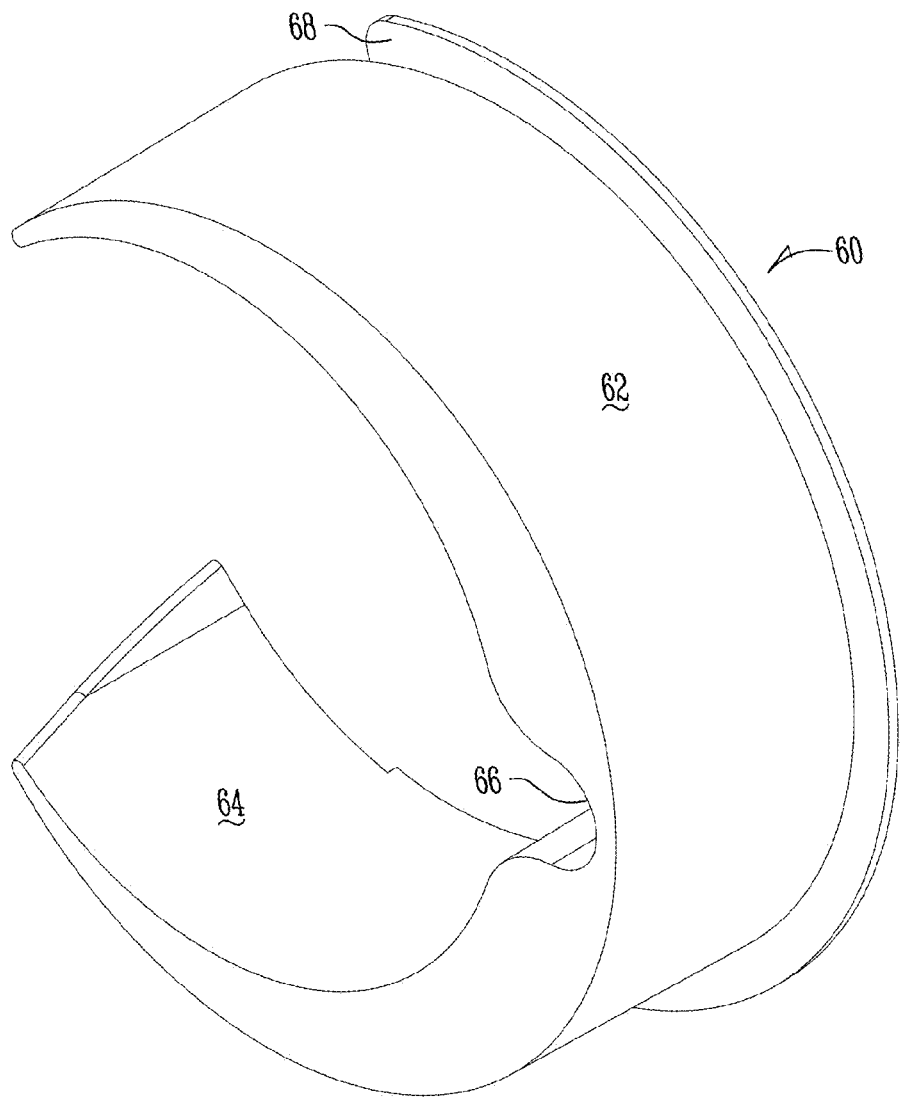
FIG. 13 shows a side view of the spacer of one embodiment of the present invention.

As is shown in FIG. 3, handlebars 12 may have a variety of diameters, so spacers 60 are preferably provided to allow for the clamp 10 to fit a variety of handlebars 12. Each of these spacers 60, an example of which is shown in FIG. 13, includes an exterior surface 62 that fits inside the clamp 18 and an interior surface 64 that contacts the handlebar 12. To accommodate placing of the spacer 60 into the interior of the clamp 18, the spacer 60 includes a flexible portion 66 that bends to allow the spacer 60 to be inserted inside of the diameter of the clamp 18.

Figure 5:
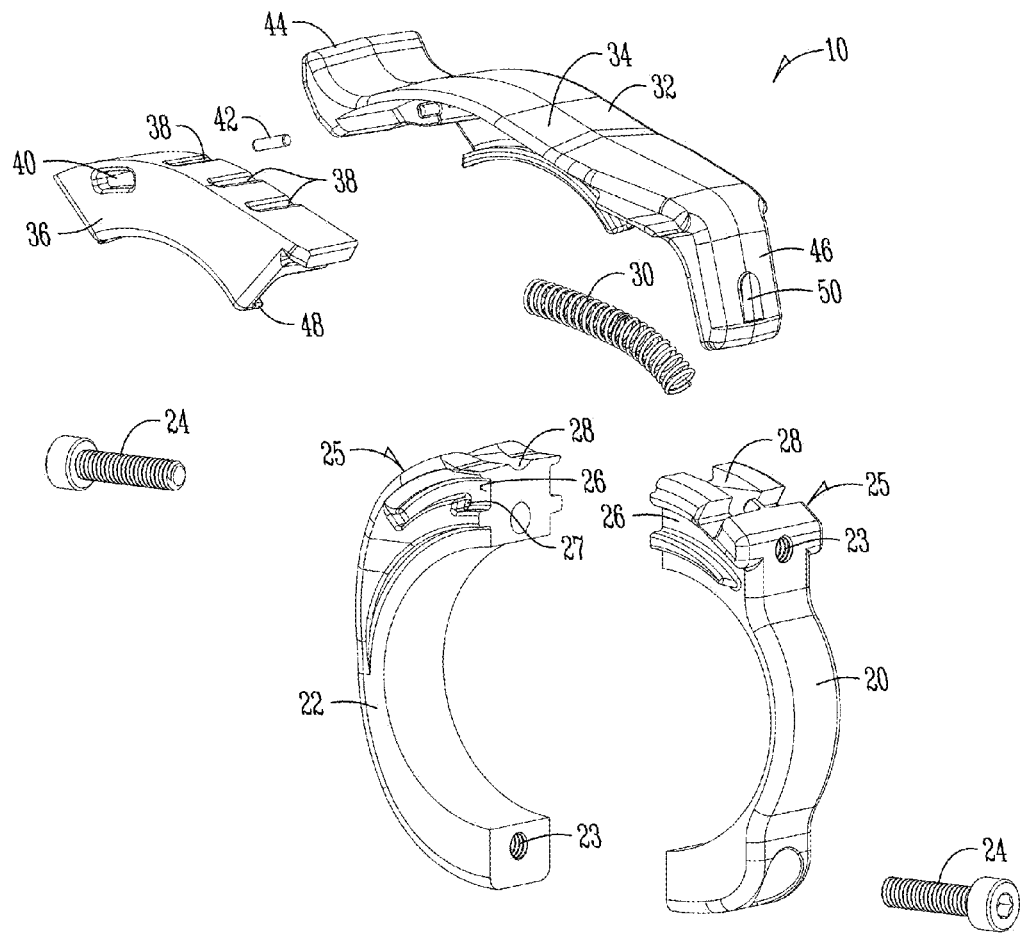
FIG. 5 shows a perspective exploded view of the various components in the restraining device.
Figure 6:
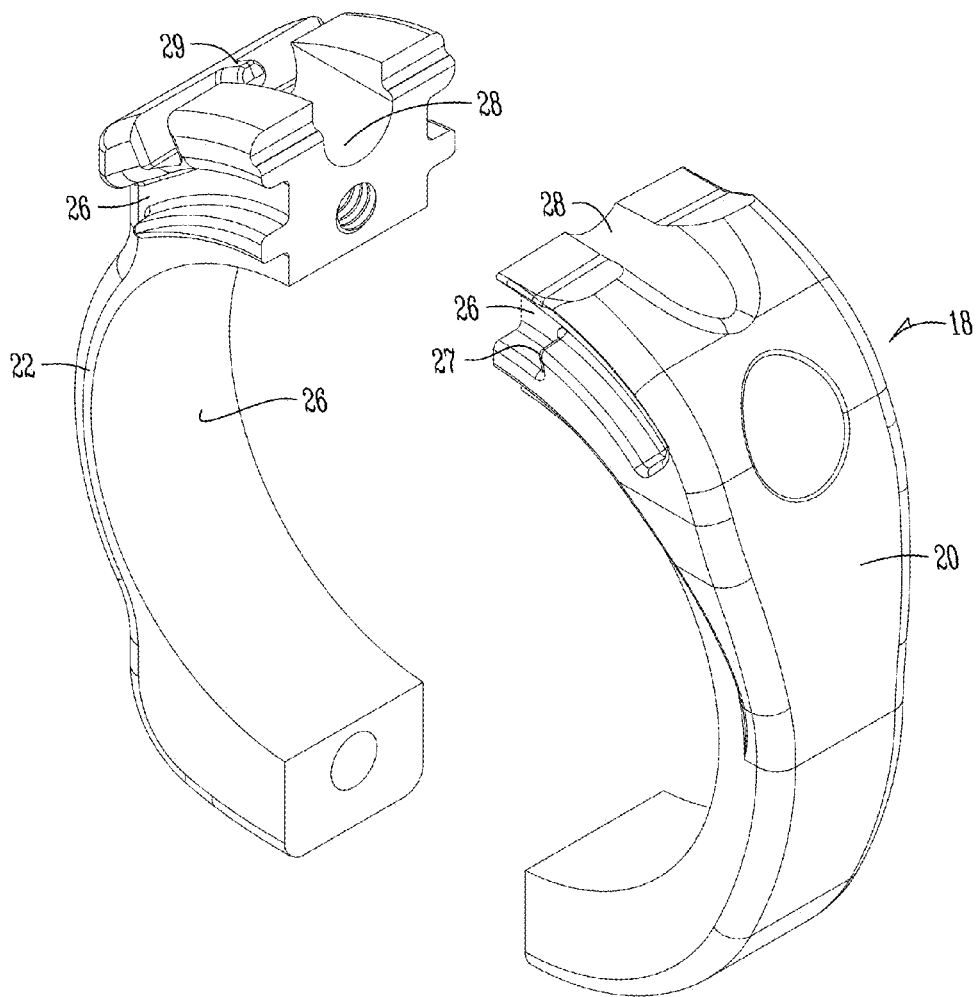
FIG. 6 shows a perspective view of the ring portion of one embodiment of the present invention.
Figure 7:
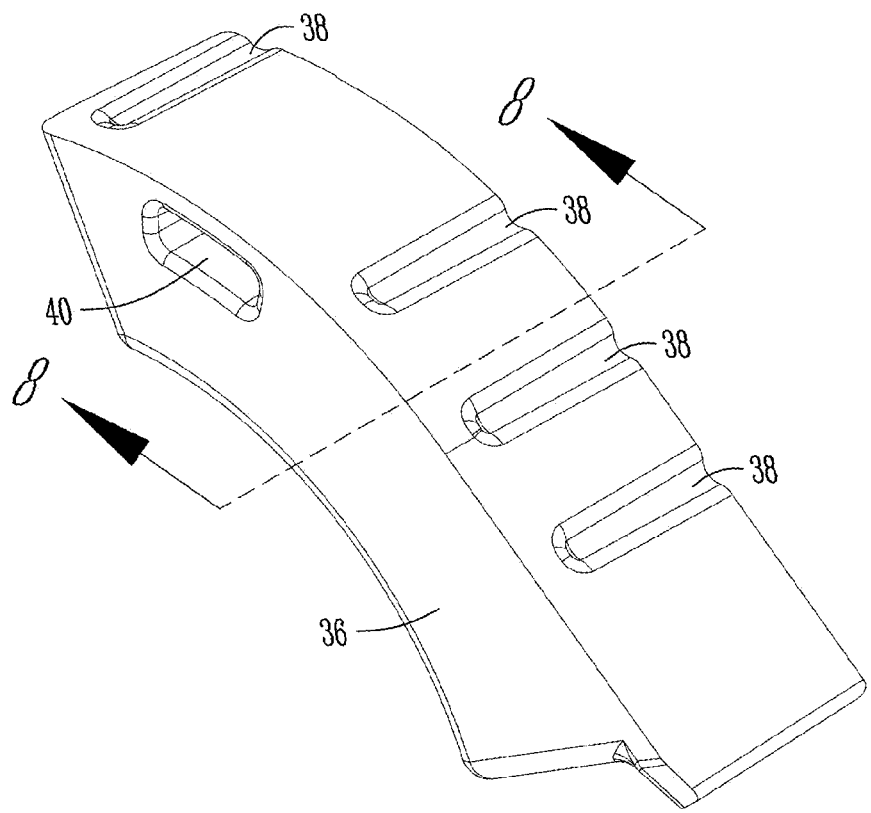
FIG. 7 shows a perspective view of a portion of the sider of one embodiment of the present invention.
Figure 8:
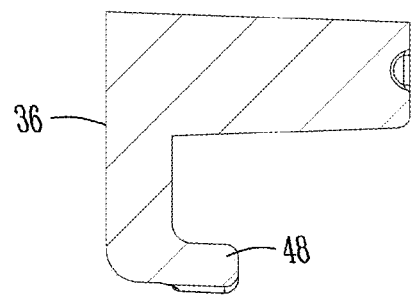
FIG. 8 shows a cross section of the slider of FIG. 7 taken along line AA.

The clamp 18 is preferably made of plastic, but may be made of metal, composites, or any other material strong enough to remain secured in place around the handlebar 12 and to support the motorcycle lever retention slider 32. Preferably, as shown in FIGS. 5 and 6, the clamp 18 is of two-piece construction with halves 20, 22 secured together by screws 24 mating with correspondingly threaded screw holes 23. While a two-piece construction is shown, the clamp 18 may be made of a single piece with an adjustable section, such as a belt, screw clamp, zip tie, etc. As shown, the two halves 20, 22 of the clamp 18 are placed around the handlebar 12 and screwed together to tightly secure the device 10 around the handlebar 12.

In this embodiment, as shown in FIGS. 5 and 6, the clamp 18 includes an extended portion 25 that supports a channel 26. Preferably, the channel 26 includes a notch 27. The notch 27 provides an interruption in the channel 26 that may be in the form of a detent, a hole, or other physical interruption in the otherwise smooth channel 27.

Figure 4:
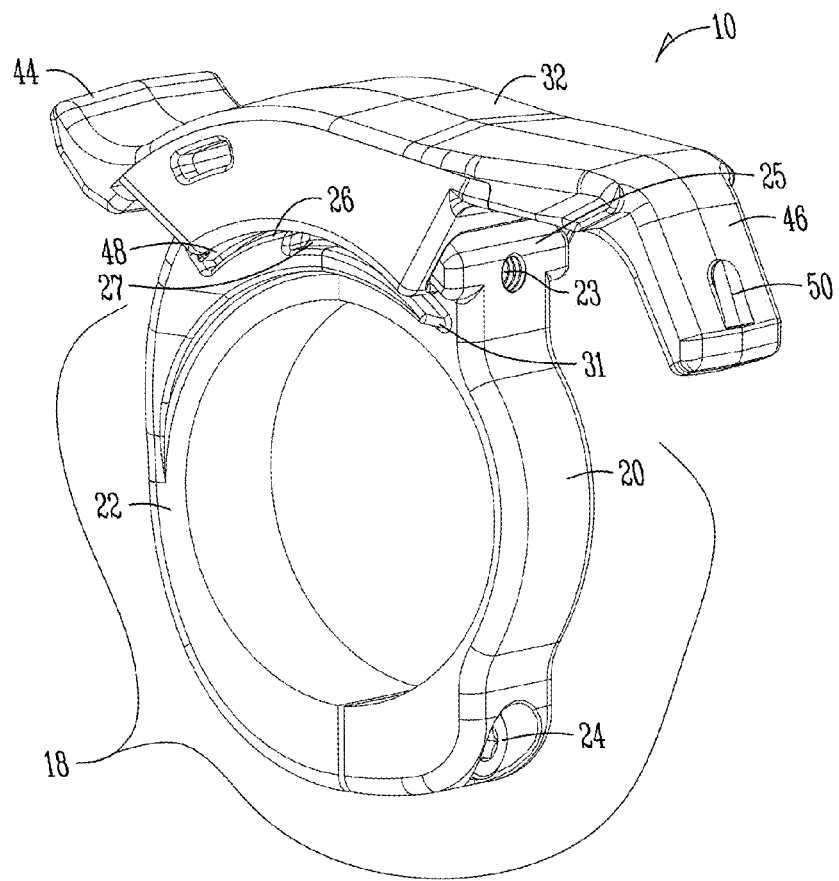
FIG. 4 shows a perspective view of one embodiment of the restraining device.

As shown in FIG. 4, a slider 32 rides on top of the extended portion 25 of the clamp 18. The slider 32, as shown in FIGS. 5, 7, 8, 9, 10, and 11, includes a slider main body 34 (shown in FIGS. 9, 10, and 11), a slider side panel 36 (shown in FIGS. 7 and 8) with slots 38 and a vent 40. The slots 38 help to ensure the slider side panel 36 is properly fit onto the slider main body 34. The slider main body 34 and the slider side panel 36 may be secured together using glue, over molding, welding, or a pin 42 as shown and as desired for the material used in the device 10.

Figure 9:
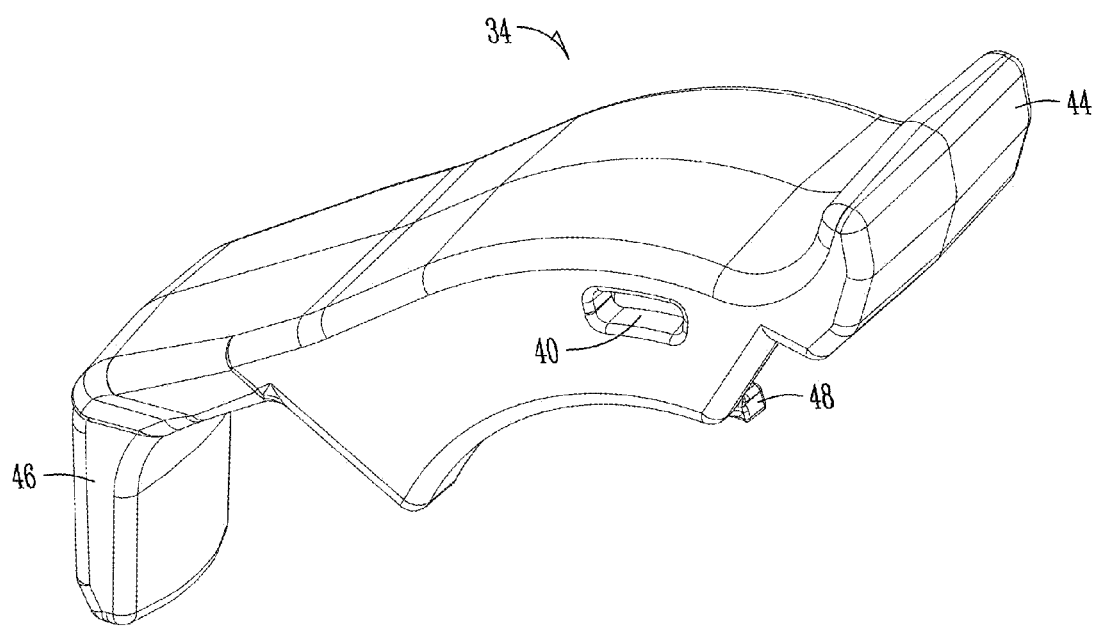
FIG. 9 shows a perspective view of the slider of one embodiment of the present invention.
Figure 10:
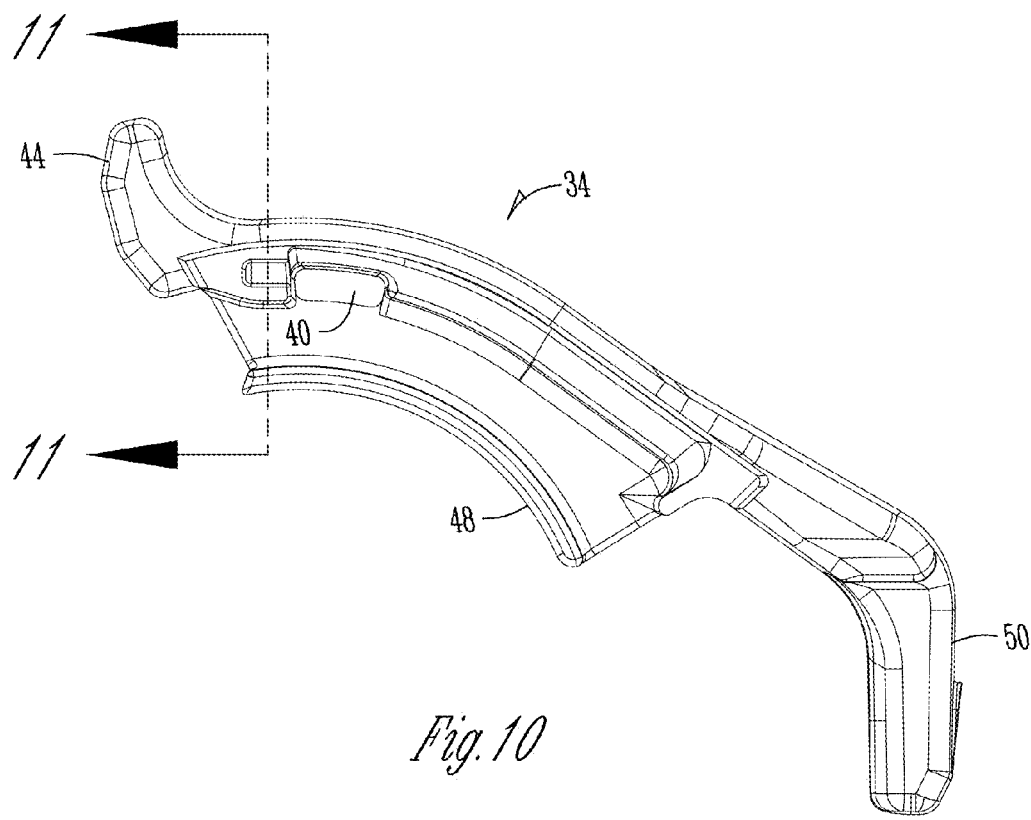
FIG. 10 shows a side view of the slider of one embodiment of the present invention.
Figure 11:
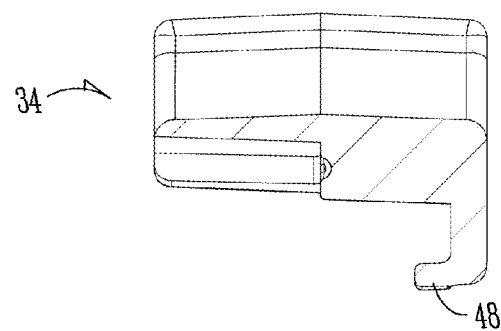
FIG. 11 shows a cross sectional view of the slider of FIG. 10 taken along the 11-11 line.

As shown in FIG. 9, the slider main body 34 includes a thumb extension portion 44 and a lever retention extension portion 46. In between the thumb extension portion 44 and the lever retention extension 46 is a portion of the slider in which a rail 48 is provided. The slider 32 may have a slider first side (provided in this example by the slider main body 34) and a slider second side (provided in this example by the slider side panel 36) and may have a rail 48 on each of the slider first side and the slider second side. As is shown in FIG. 4, the rail 48 is slidably secured in the channel 26 to travel in a circumferential direction about the handlebar 12.

As shown in FIGS. 1 and 2, the slider 32 has a first position and a second position. In the first position, shown in FIG. 1, the slider 32 is located about the clamp 18 in a position where the rail 48 is not engaged by the notch 27. In this first position, the lever retention extension 46 is in the lever retention extension first position and the motorcycle lever 14/16 is not engaged by the device 10. The gap 56 between the handlebar 12 and the lever retention extension 46 is shown.

The rider can move the slider 32 from the first position to the second position (shown in FIG. 2) by pressing on the thumb extension portion 44. In order for the slider 32 to move back and forth and to engage in the notch 27, the length of the slider rail 48 must be less than the distance between the notch 27 to the end 31 of the channel 28.

Figure 12:
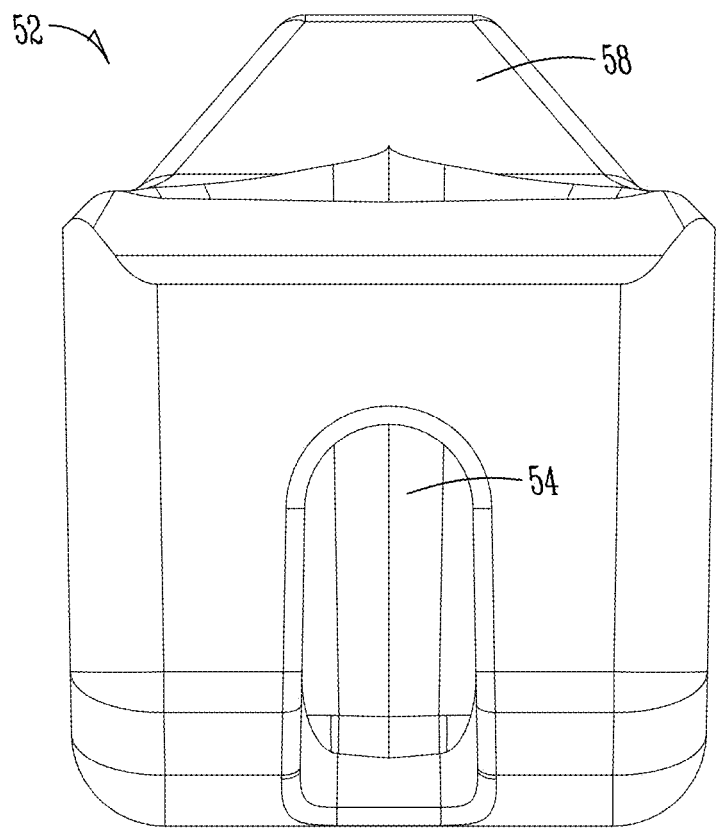
FIG. 12 shows a front view of one embodiment of an end spacer of one embodiment of the present invention.

The pressure from the rider causes the slider's rails 48 to slide through the channel 28 toward a second position as shown in FIG. 2. In the second position, the slider 32 is rotated about the clamp to a location where the rail 48 is engaged by the notch 27. In the slider second position, the lever retention extension 46 is extended to the lever retention extension second position to retain the motorcycle lever 14/16 in the secured position. In order to ensure that the lever retention extension 46 maintains the lever 14/16 in the secured position, lever retention extension additions 52 are preferably provided, as shown in FIGS. 3 and 12.

These additions 52 are slidably secured over the tip of the lever retention extension 46 by a snap fit notch 50 and groove 54 arrangement. The groove 54 or slot on the addition 52 fits over and snaps around the notch 50 or ramp on the lever retention extension 46 to secure the addition 52 as part of the lever retention extension 46. In this manner, the lever retention extension addition 52 can quickly and easily add thickness to the lever retention extension 46 to adjust the distance 56 between the lever retention extension 46 and the handlebar 12 and to retain the lever 14/16 further against the handlebar 12. As shown in FIG. 3, a variety of additions 52 with a variety of extensions 58, as shown in FIG. 12, can be provided to ensure that the lever retention extension 46 retains the lever 14/16 as much as desired.

Preferably, as shown in FIG. 3, the device 10 is sold with a plurality of spacers 60 of various thickness to adjust to a variety of handlebar 12 diameters and a plurality of lever retention extension additions 52 to provide a variety of lever retention positions. These may all be sold together as a universal kit that can be used by a rider to fit a variety of motorized vehicles.

The slider 32 is maintained in the second position until the rider applies some additional pressure to lift the slider rail 48 from the notch 27. This additional pressure is preferably assisted by a spring 30 as shown in FIG. 5. The spring 30 is maintained in a groove 28 and secured about a spring post 29 as shown in FIG. 6. The spring 30 has an extended position and a relaxed position. When the slider 32 is in the first position, the spring 30 is at its relaxed position and has a first length. When the slider 32 is moved into its second position, the spring 30 is compressed and applies a spring force attempting to move the slider 32 back to the slider first position.

When the slider is in the slider 32 is in its slider second position, the spring 30 is compressed and has a second length. The notch 27 in the channel 26 is used to counter the spring force applied by the spring 30 while the slider 32 is in the slider second position. In this manner, when the slider's thumb portion 44 is pushed outwardly from the handlebar 12, the rail 48 becomes dislodged from the notch 27, allowing the spring 30 to force the slider 32 back into the slider first position.

By having the slider 32 located on the bottom portion of the clamp 18, gravity will also contribute to rotating the slider 32 back and out of a secured position. Additionally, if the spring 30 should fail, when the slider rail 48 is moved out of the notch 27, any pressure from the lever 14/16 will help to push the lever retention extension 46 down and away, moving the slider 32 back to the slider first position. All of these forces help ensure the release of the lever 14/16 from the lever retention extension 46 and ensures the lever 14/16 can freely move from a restrained to an extended position. Thus, this arrangement ensures safety by providing a number of ways to move the slider 32 from the second position back to the first position.

Figure 14:
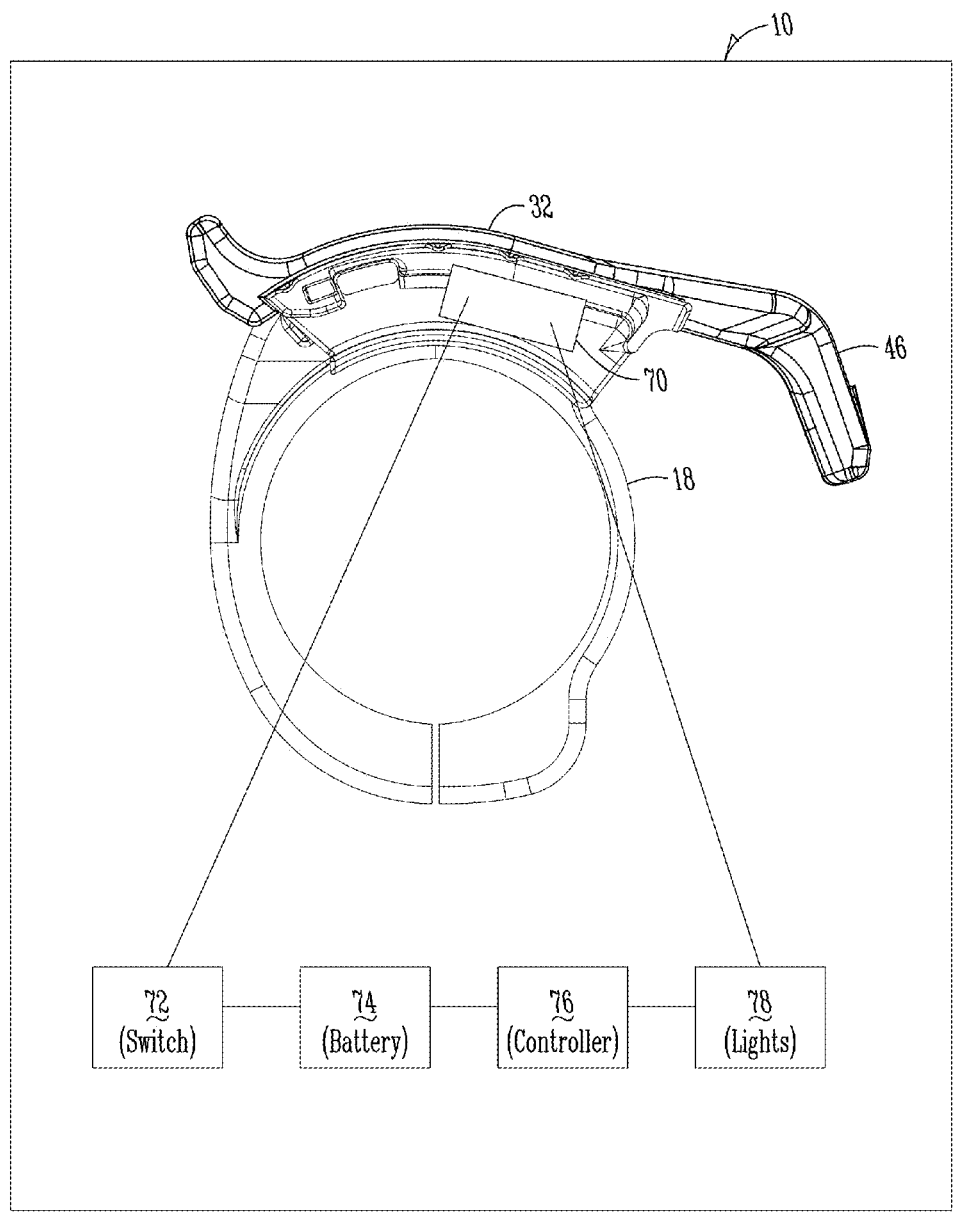
FIG. 14 shows a side view of an alternative embodiment of the present invention.
Figure 15:
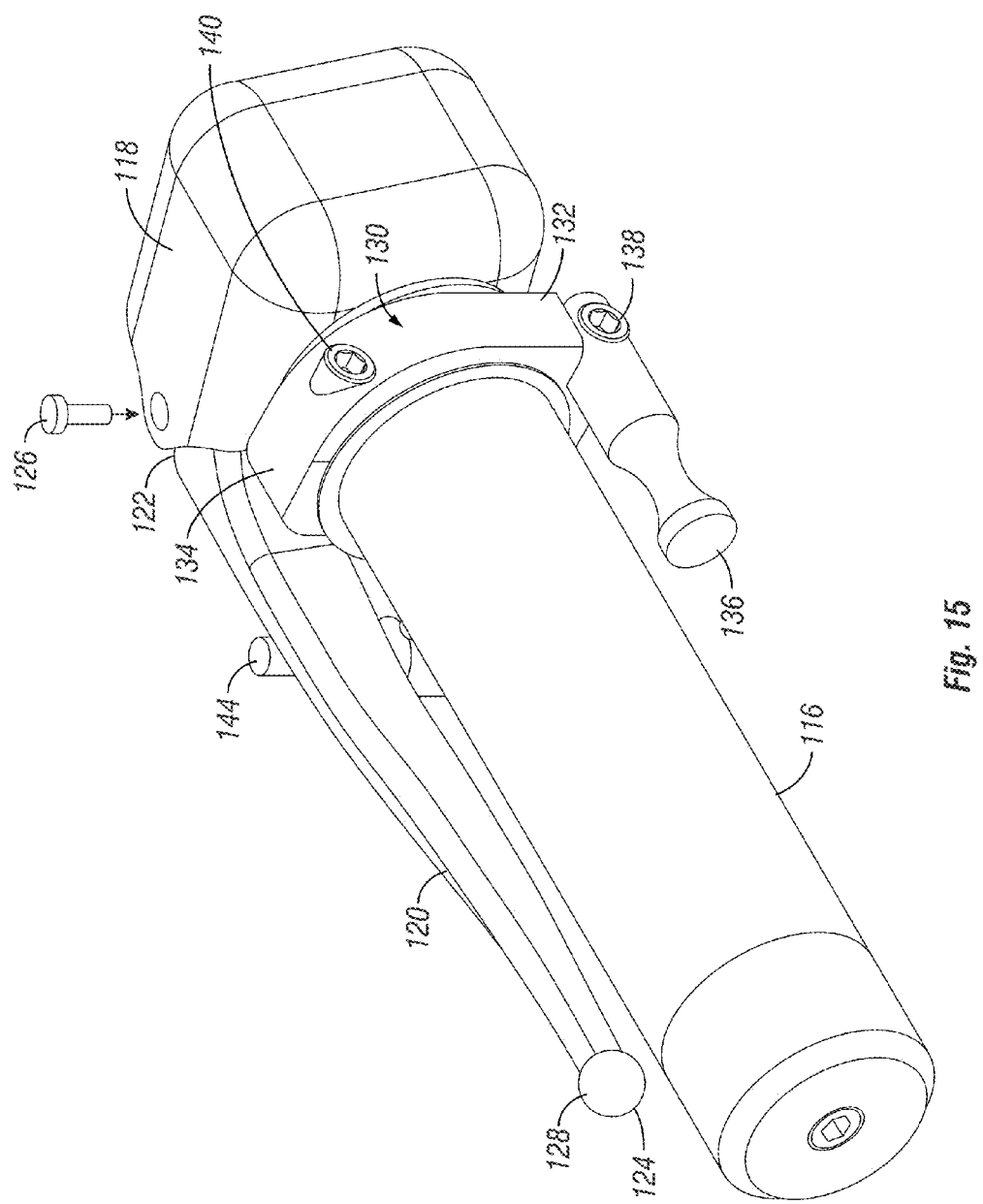
FIG. 15 shows a perspective view of an alternative embodiment of the present invention.
Figure 16:
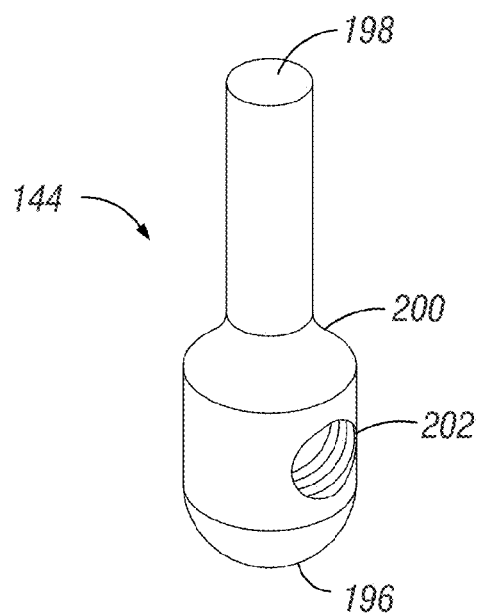
FIG. 16 shows a perspective view of a clutch catch upper end of another alternative embodiment of the present invention.
Figure 17:
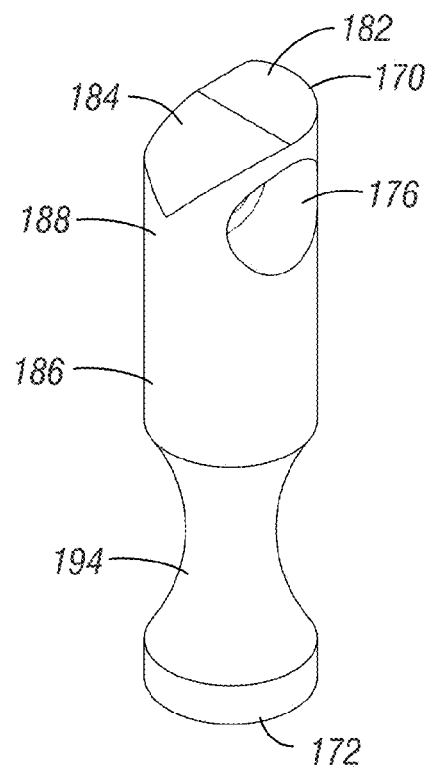
FIG. 17 shows a perspective view of a clutch catch lower end of an alternative embodiment of the present invention.
Figure 18:
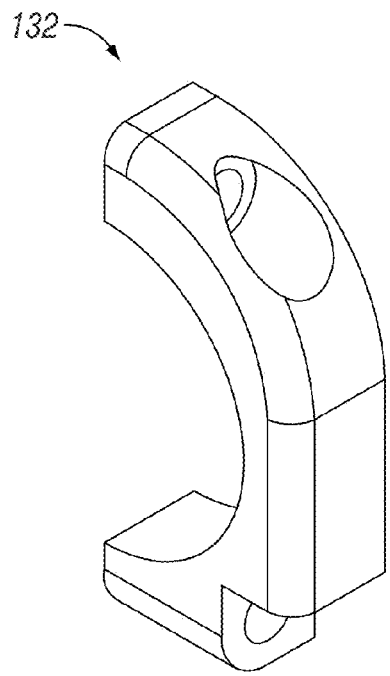
FIG. 18 shows a perspective view of one half of a collar in an alternative embodiment of the present invention.
Figure 19:
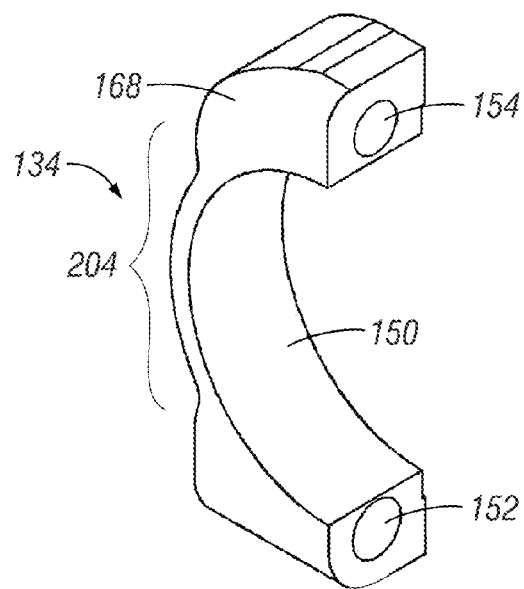
FIG. 19 shows a perspective view of another half of a collar in an alternative embodiment of the present invention.
Figure 20:
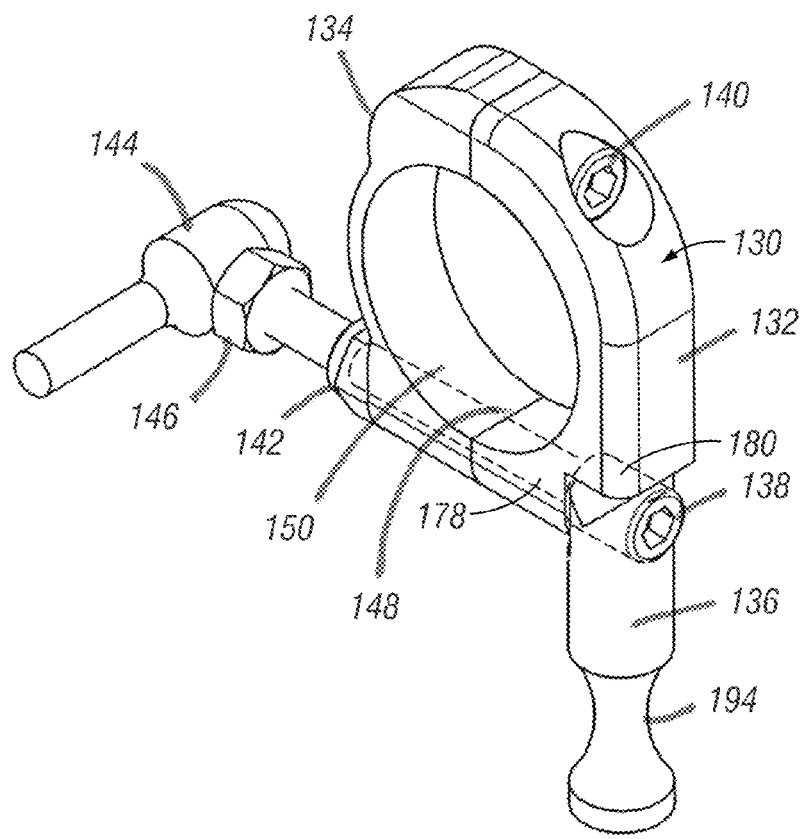
FIG. 20 shows a perspective view of and assembled, but uninstalled alternative embodiment of the present invention.
Figure 21:
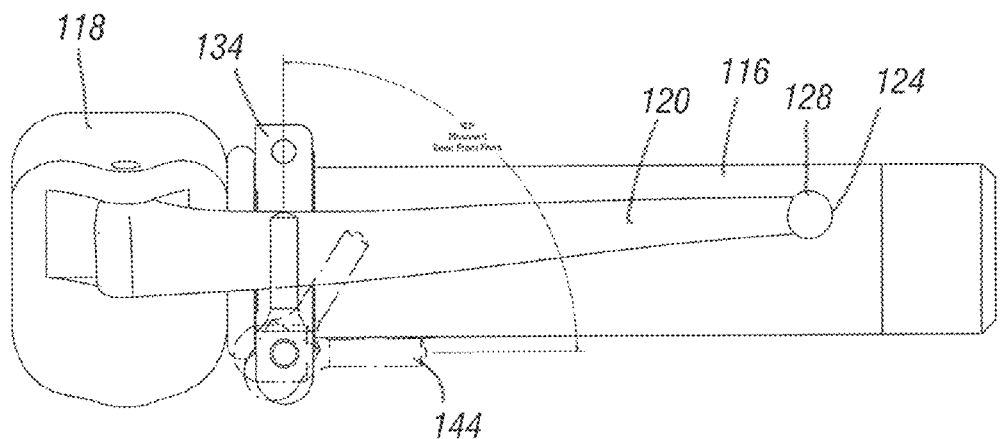
FIG. 21 shows a side view of an alternative embodiment of the present invention installed and in a plurality of positions.
Figure 22:
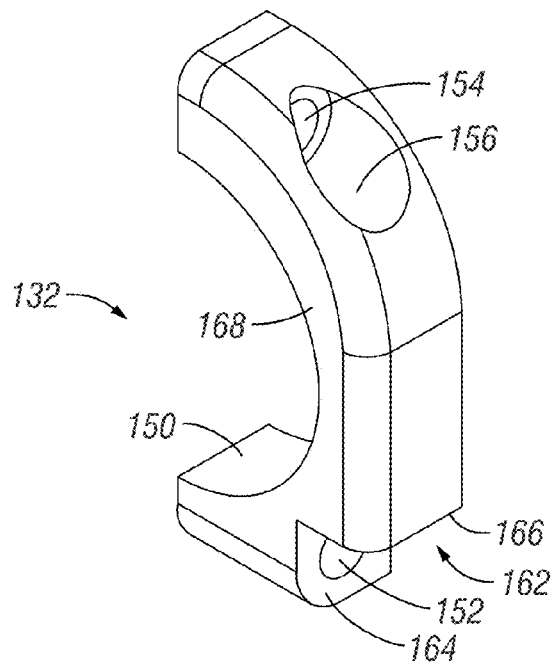
FIG. 22 shows a perspective view of one half of a collar in an alternative embodiment of the present invention.
Figure 23:
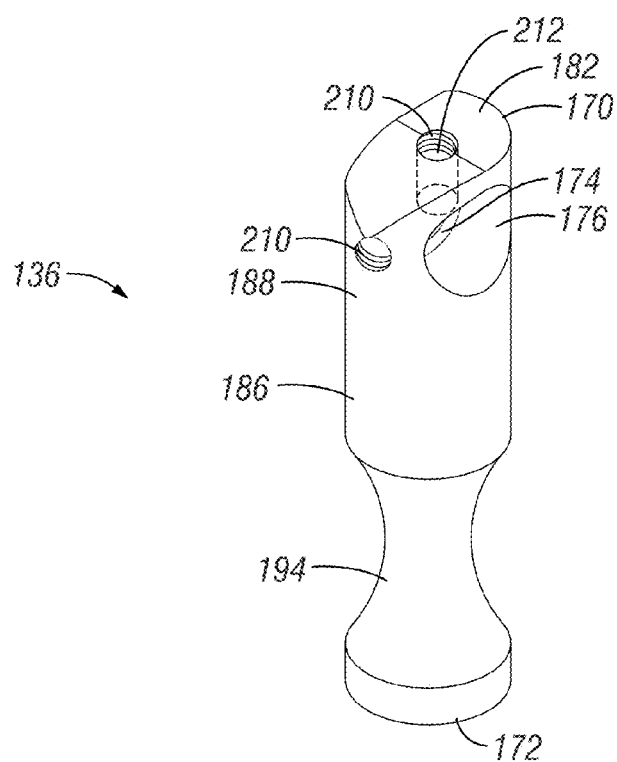
FIG. 23 shows a perspective view of a clutch catch lower end of an alternative embodiment of the present invention.
Figure 24:
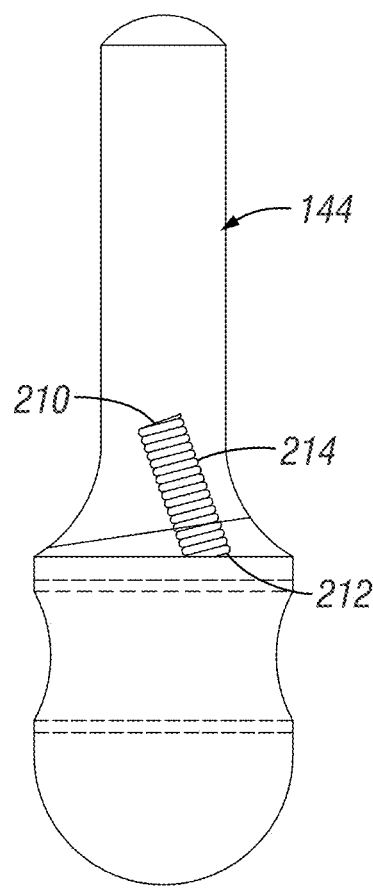
FIG. 24 shows a sectional view of a clutch catch upper end of FIG. 16 of an alternative embodiment of the present invention.

While a spring 30 is preferred to provide this force, other mechanisms can be used. For example, as shown in FIG. 14, the device 10 can use an electro mechanical arrangement. In this embodiment, the slider 32 is moved between a first and second position by a servo or motor 70 connected to an electronic circuit, typically consisting of a switch 72, a power source or battery 74, a controller 76 and an indicator light or lights 78. When current is applied, the servo 70 moves the slider 32 from the slider first position to the slider second position.

In another embodiment, the clutch assistance system and method of use 110 (system 110) is presented. As one of countless examples, system 110 is shown used on a left handlebar 112 of a conventional motorcycle 114. The handlebar 112 includes a grip 116 and a control housing 118. A clutch lever 120 is pivotally connected to the control housing 118 and pivots between a biased extended position wherein the clutch is fully engaged, and a retracted position wherein the clutch is fully disengaged. In the extended position, clutch lever 120 is as far away from the handle bar 112 and grip 116 as possible. In the retracted position, clutch lever 120 is as close to handle bar 112 and grip 116 as possible.

Handlebar 112 is any form of any suitable size, shape and design and is configured to be held by the operator and use for steering. In the arrangement shown, as one example, handlebar 112 is a generally tubular member that is bent and curved to serve its intended purpose. The grip 116 and control housing 118 are mounted to handle bar 112.

Grip 116 is formed of any suitable size, shape and design and is configured to provide a comfortable and convenient grip for the operator to hold. In the arrangement shown, grip 116 is positioned over handlebar 112 at the outward end of handlebar 112.

Control housing 118 is formed of any suitable size, shape and design and is configured to hold and house various components that work to operate and control motorcycle 114. In the arrangement shown, control housing 118 is positioned at the inward end of grip 116. In the arrangement shown, clutch lever 120 pivotally connects to control housing 118 and extends outward in the direction of grip 116. In some arrangements, control housing 118 houses and holds light switches, horn buttons, turning signals, hazard signals or any other control for motorcycle 114.

Clutch lever 120 is formed of any suitable size, shape and design and is configured to operate a clutch of motorcycle 114. In the arrangement shown, clutch lever 120 extends a length from an inward end 122 to an outward end 124. Clutch lever 120 pivotally connects to control housing 18 at or near its inward end 122 at axle 126. Axle 126 is any form of a device 110 that connects clutch lever 120 to control housing 118 and allows pivotal rotation thereon. Clutch lever 120 lever includes a feature 128 positioned at the outward end 124 that indicates the end of clutch lever 120 to an operator and helps to prevent end of clutch lever from slipping off of the operator's hand. Clutch lever 120 arcs, bends and curves in any arrangement as it extends from inward end 122 to outward end 124. In an extended position (clutch engaged), clutch lever 120 is positioned at an angle to and a distance away from grip 116 and handle bar 112; whereas in a retracted position (clutch disengaged), clutch lever 120 is positioned substantially closer and in approximate parallel spaced alignment to grip 16 and handle bar 112.

Most if not all motorcycles 114 do not include a clutch assistance device 110 that helps to hold the clutch lever 120 in a retracted position. As such, there are millions and millions of motorcycles 114 that have been manufactured that are the target market for the system 110. As such, system 110 is configured to be installed on practically any motorcycle 114 without substantial modifications to the motorcycle 114 and without interfering with the other systems or configuration of motorcycle 114.

The clutch assistance system, system 110, is formed of any suitable size, shape and design and is configured move between an engaged position and a disengaged position. In an engaged position, system 1110 holds clutch lever 20 at its most inward position (wherein the clutch lever 120 is in its retracted position where the clutch disengaged). In a disengaged position, system is free from interference with clutch lever 120 and allows clutch lever 120 to return to its biased extended position where the clutch is engaged. In one arrangement, as is shown, system 110 is formed of a collar 130, which is itself formed of an interior collar 132 and an exterior collar 134, a thumb latch 136, a first shaft 138, a second shaft 140, a first nut 142 a clutch catch 144 and a second nut 146 among other components.

Collar: Collar 130 is formed of any suitable size, shape and design and is configured to fit around handle bar 112 and/or grip 116 of practically any motorcycle 114 and tightly affix thereto without modification of the motorcycle 114. In the arrangement shown, collar 130 is itself formed of two components, an interior collar 132 and an exterior collar 134 that join together along a seamline 148. As most motorcycle handlebars 112 and grips 16 are circular in nature, interior collar 132 and exterior collar 134 together form an interior surface 150 that is generally circular in nature and is sized and shaped to fit standard motorcycle handlebar 112 and grip 116 sizes. In one arrangement, seamline 148 extends through approximately the middle of the circle formed by interior surface 150 and as such both the interior collar 132 and exterior collar 134 cover approximately half of the circumference of handlebar 112 and grip 1116.

The lower end of interior collar 32 and exterior collar 134 include a bore 152 that extends through the lower end of interior collar 132 and the lower end of exterior collar 134 when the two components are aligned around handlebar 112 and/or grip 116. Bore 152 is sized and shaped to receive and allow first shaft 138 to extend there through. Bore 152 is generally circular in shape so as to allow rotation of first shaft 138 within bore 152. First shaft 138 is sized and shaped to extend through and fit within bore 152 with close and tight tolerances which allow rotation of first shaft 138 within bore 152 but do not allow for excessive movement within bore 152. When bore 152 of interior collar 132 and exterior collar 134 are aligned around handlebar 112 and/or grip 116, first shaft 138 pulls the interior collar 132 and exterior collar 134 together thereby tightening the lower end of collar 130 around handlebar 112 and/or grip 116. In one arrangement, the entire length of bore 152 is smooth, whereas in contrast in other arrangements all or a portion of bore 152 is threaded and meshes with threads on first shaft 138.

The upper end of interior collar 132 and exterior collar 134 include a bore 154 that extends through the upper end of interior collar 132 and the upper end of exterior collar 134 when the two components are aligned around handlebar 112 and/or grip 116. Bore 154 is sized and shaped to receive and allow second shaft 140 to extend there through. Bore 154 is generally circular in shape so as to allow rotation of second shaft 140 within bore 154. Second shaft 138 is sized and shaped to extend through and fit within bore 154 with close and tight tolerances which allow rotation of second shaft 140 within bore 154 but do not allow for excessive movement within bore 154. When bore1 54 of interior collar 132 and exterior collar 134 are aligned around handlebar 112 and/or grip 116, second shaft 140 pulls the interior collar 132 and exterior collar 134 together thereby tightening the upper end of collar 130 around handlebar 112 and/or grip 116. In the arrangement shown, to facilitate tightening of the interior collar 132 to the exterior collar, the portion of bore 154 within the interior collar 132 is smooth whereas the portion of bore 154 within exterior collar 134 is threaded. In this arrangement, the exterior end of second shaft 140 includes a threaded portion that threadably meshes with the threads in the bore 154 of exterior collar 134 such that when the second shaft 140 is rotated, this threaded engagement tightens interior collar 132 to exterior collar 134.

In the arrangement shown, the interior end of bore 154 within interior collar 132 includes a stepped portion 156 that has a larger diameter than the other portions or more exterior portions of bore 154. This stepped portion 156 is sized and shaped to receive a head 158 of second shaft 140 within close and tight tolerances. Head 158 is larger in diameter than the shaft 60 of second shaft 140 and as such the stepped portion 156 of bore 154 receives head 158 therein but prevents the passage of head 158 there through. This provides a more finished appearance to the system 110, a smoother exterior surface to the system and it eliminates edges that could catch on an operator's hands or clothing. Upon tightening second shaft 140 within bore 154, the threaded engagement of the exterior end of second shaft 140 with the threaded portion of exterior collar 134 pulls the two collars 132, 134 as the head 158 is prevented from passing stepped portion 156.

The lower end of interior collar 132 includes a step 162. Step 162 is positioned at the inward end of bore 152. When viewed from the side, step 162 is generally square, or said another way, is formed of a square corner. Step 162 includes an inward face 164 that extends in approximate perpendicular alignment to the length of bore 152 and forms a generally flat plane. Step 162 includes an upper face 166 that extends in approximate parallel spaced alignment to the length of bore 152 and forms a generally flat plane. Upper face 166 also is aligned to extend in approximate perpendicular alignment with the opposing sides 168 of collar 130. In the arrangement shown, opposing sides 168 of collar 130 are generally flat and extend in approximate parallel space alignment to one another. Step 162 is sized and shaped to receive the upper end of thumb latch 136.

Thumb latch 136 is formed of any suitable size, shape and design and is configured to be engaged by the operator's hand to engage and disengage the system 110. In the arrangement shown, thumb latch 136 extends from an upper end 170 to a lower end 172. A bore 174 is positioned adjacent the upper end 170 of thumb latch 136 and extends in approximate perpendicular alignment to the vertical height of thumb latch 136. Bore 174 also includes a step 176 that has a larger diameter than bore 174. Bore 174 is sized and shaped to receive the shaft 178 of first shaft 138 and step 178 is sized and shaped to receive the head 180 of first shaft 138.

The upper end 170 of thumb latch 136 is configured to fit within step 162 in the lower end of interior collar 132. When in position within step 162 of interior collar 132, the bore 174 of thumb latch 136 aligns with the bore 152 in the lower end interior collar 132 and exterior collar 134. Once in this aligned position, the shaft 178 of first shaft 138 is inserted there through, until the step 176 in thumb latch 136 stops the inward progression of first shaft 138. Head 180 is larger in diameter than the shaft 178 of first shaft 140 and as such the step 176 of bore 174 receives head 180 therein but prevents the passage of head 158 there through. This provides a more finished appearance to the system 110, a smoother exterior surface to the system and it eliminates edges that could catch on an operator's hands or clothing. Upon tightening first shaft 138 within bores 152, 174 the engagement of the inward end of head 180 with the step 176 pulls the two collars 132, 134 together while also setting the amount of resistance required to rotate thumb latch 136.

The upper end 170 of thumb latch 36 includes an upper stop surface 182. In the arrangement shown, upper stop surface 182 is generally flat and planar in shape and extends in approximate perpendicular alignment to the sides 168 of collars 132, 134, and extends in approximate parallel spaced alignment to the length of bores 152, 174. When in position within step 162 of the lower end of interior collar 132, the upper stop surface 182 is in flat and flush engagement and abutment with the upper surface 166 of step 162 when thumb latch 136 is in a fully downward or fully disengaged position. The engagement between upper stop surface 182 of thumb latch 136 and upper surface 166 of step 162 of interior collar 132 prevents any further rotation of thumb latch 136.

Upper stop surface 182 connects in smooth fashion to cam surface 184. Cam surface 184 is essentially a rounded corner to the upper end 170 of thumb latch 136. Just like upper stop surface 182 prevents rotation of thumb latch 136 once the upper stop surface 182 engages the upper surface 166 of step 162, cam surface 184 allows rotation of thumb latch 136. As thumb latch 136 is rotated from the fully disengaged position toward the fully engaged position (that is a clockwise direction) the cam surface 184 provides clearance for this rotation by removing the material that would engage upper surface 166. Cam surface 184 smoothly connects flat stop surface 182 downward to the side 186 of thumb latch 136. The side 186 of thumb latch extends in approximate perpendicular alignment to upper stop surface 182.

When thumb latch 136 is fully rotated in the clockwise direction a side stop surface 188 positioned at the upper end of side 186, or at the lower end of cam surface 184, engages the upper surface 166 of step 162 of interior collar 132 and prevents further rotation of thumb latch 136. In this position, where the side stop surface 188 engages the upper surface 166 of step 162, the thumb latch 136 is in a sideways position or a fully engaged position.

In this way, thumb latch 136 rotates approximately ninety degrees between hard stop and hard stop. That is, in a fully disengaged position, thumb latch 136 is vertically positioned with upper stop surface 182 engaged with upper face 166 of step 162 of interior collar 132; and in a fully disengaged position, thumb latch 136 is laterally positioned with side stop surface 188 engaged with upper face 166 of step 162 of interior collar 132.

The rearward side of thumb latch 136, the side opposite step 176, includes a recess 190. Recess 190 forms a plane that is in-set to the exterior rearward surface of thumb latch 136 and extends in approximate parallel spaced alignment to the length of thumb latch 136 and extends in approximate perpendicular alignment to the length of bore 174, 152. Recess 190 provides relief to thumb latch 136 and allows thumb latch 136 to be set in over interior collar 132. Also, the lower surface 192 of recess 190 forms a co-acting stop surface when thumb latch 136 is in a fully engaged position. That is, when thumb latch 136 is moved to a fully engaged position, where thumb latch 136 is sideways, lower surface 192 engages the side 168 of interior collar 132 simultaneously when the side stop surface 188 engages the upper surface 166 of step 162 of interior collar 132. Providing these dual stop surfaces increases accuracy.

The lower end of thumb latch 136 is formed of any suitable size, shape and design. In one arrangement, other than the features described herein, the thumb latch 136 is generally cylindrical in shape. In the arrangement shown, as one example, the lower end of thumb latch 136 is recessed to have a neck 194 therein that is smooth and curved. This neck 194 provides improved aesthetic appearance as well as provides a convenient recess or grip for the operator's thumb or fingers to help engage or disengage the system.

While in the arrangement shown the step 176 is shown as circular in nature, and the head 180 of first shaft 38 is similarly shown as circular in nature, it may be desirable in some applications to lock the relationship between head 180/first shaft 138 and thumb latch 136 by forming step 176 in a non-round shape such as hexagonally, square, rectangular or the like which receives a similarly non-round shaped head 180, such as hexagonally, square, rectangular or the like. In this way, the engagement of between the non-round head 80 in the non-round step 176 locks the relationship between first shaft 138 and thumb latch 136 ensuring when one is rotated so is the other rotated. This prevents the possibility that the thumb latch 136 can rotate upon the first shaft 138, which could happen when both components are round.

Exterior collar 134 is formed of any suitable size, shape and design. The upper end of exterior collar 134 includes bore 154 which includes threads or a threaded section that is sized and shaped to threadably engage a threaded section of second shaft 140 thereby allowing tightening between interior collar 132 and exterior collar. The lower end of exterior collar 134 includes bore 152 which is sized and shaped to allow the passage of first shaft 138 there through.

A first nut 142 is connected to first shaft 138 just outside of bore 152. This first nut 142 is tightened against the exterior surface of exterior collar 134 thereby tightening thumb latch 136 and the lower ends of interior collar 132 and exterior collar 134 together. As this first nut 142 is tightened this sets the resistance or difficulty at which it takes to move the thumb latch 136. In one arrangement, as it is undesirable for the first nut 142 to loosen over time, first nut 142 is a lock nut, also known as a nylock nut which has a nylon or other composite piece therein that helps to prevent unintentional loosening between first nut 142 and first shaft 138. In an alternative arrangement, on or more washers or lock washers are used between the exterior surface of exterior collar 34 and the interior surface of first nut 142 to prevent unintentional loosening between first nut 142 and first shaft 138.

Second nut 146 is positioned on first shaft 138 and is positioned a distance away from first nut 142. Like first nut 142 it is undesirable for second nut 146 to unintentionally loosen and for this reason, in one arrangement second nut 146 is a lock nut, also known as a nylock nut which has a nylon or other composite piece therein that helps to prevent unintentional loosening between second nut 146 and clutch catch 144 to which second nut 146 is engaged. In an alternative arrangement, on or more washers or lock washers are used between the exterior surface of second nut 46 and the interior surface of clutch catch 44 to prevent unintentional loosening between second nut 46 and clutch catch 144.

Clutch catch 144 is formed of any suitable size, shape and design and is configured to engage and hold clutch lever 120 in a retracted and disengaged position. In the arrangement shown, clutch catch 144 extends from a lower end 196 to an upper end 198. In the arrangement shown, both the lower end 196 and the upper end 198 are generally cylindrical in shape with the lower end 196 having a substantially larger diameter than the upper end 198. The larger diameter lower end 196 smoothly connects to the smaller diameter upper end 198 at a curved section 200. The lower end 196 terminates in a rounded end at its lower most end and includes a bore 202 slightly above its end. In one arrangement, as is shown, bore 202 is threaded and is sized and shaped to threadably engage the threads on the outward end of first shaft 138.

Clutch catch 144 is installed on the exterior threaded end of first shaft 138 after first nut 142 and second nut 146 are installed thereon. Next, the angle and distance of clutch catch 144 are set by rotating the clutch catch 144 over the threaded portion of first shaft 138. Once the desired position is set the second nut 146 is tightened against the interior surface of the clutch catch 144 thereby locking the two components together.

The exterior side of exterior collar 134 includes a narrow band section 204. When clutch lever 120 is in a fully retracted position and the clutch is disengaged, the clutch lever is pulled to within close distances of handle bar 114 and/or grip 116.

To provide needed clearance between the interior surface of clutch lever 120 and handle bar 114 and/or grip 116 band section 204, which is positioned between the upper end and lower end of exterior collar 134 is relatively thin thereby providing as much clearance as possible for clutch lever 120 to be pulled in tight against handle bar 114 and/or grip 116.

To provide an improved aesthetic appearance, reduce the material needed to form system 110, and to smooth the device 110 so as to prevent an operator from catching their clothing or a finger on the system 110, where possible the corners and edges of the system 110 are rounded or chamfered. This is particularly evident in the outside edges and corners of interior collar 132 and exterior collar 134.

To accommodate handle bar 114 and/or grip 116 of various sizes a spacer 206 may be used. Spacer 206 is formed of any suitable size, shape and design and is configured to modify the size of the handle bar 114 and/or grip 116 to fit within the interior surface 150 of collar 130. In one arrangement, as is shown, spacer 206 is a generally circular collar that is flexible and can be placed over handle bar 114 and/or grip 116 thereby increasing the diameter of handle bar 114 and/or grip 116. Spacer 206 can also include a lip positioned at either or both of the interior edge and the exterior edge of the spacer 206 so as to help maintain the collar 130 within the spacer 206.

Grip Extension: the side 168 to side 168 width of collar 130 takes up valuable space on the handle bar 112 and/or grip 116. To compensate for this, in some arrangements it is desirable to install a grip extension at the end of handle bar 112.

In Operation: The system 110 is installed on motorcycle 114 by placing interior collar 132 on the interior side of handle bar 114 and/or grip 116 and placing exterior collar 134 on the exterior side of handle bar 114 and/or grip 116. Next, the bores 152 and 54 of the collars 132 and 34 are laligned. Once aligned, second shaft 140 is inserted through the bore 154 in the upper end of interior collar 132 and it is rotated until the threads of second shaft 140 pull the interior collar 132 and exterior collar 134 together. In this position the head 158 of second shaft 140 is situated within the step 156 in the upper end of interior collar 132.

Similarly, the first shaft 138 is inserted through bore 174 in the upper end of thumb latch 136. Next, the first shaft 138 is inserted through the bore 152 in the lower end of interior collar 132 and exterior collar 134. Next, the first nut 142 is positioned over the first shaft 138 followed by the second nut 146 followed by the clutch latch 144.

Once assembled in this manner, the position of the clutch latch 144 is adjusted for both lateral distance away from the handle bar 114 and/or grip 116 as well as for angle. Once the proper lateral distance and angle are set by a combination of rotating clutch latch 144 on first shaft 138 and rotating first shaft 138 within collar 130, the first nut 142 is tightened against the exterior surface of the exterior collar 134 and the second nut 146 is tightened against the clutch catch 144 thereby locking the arrangement between the components.

The system 110 is properly adjusted when the clutch catch 144 tightly engages the clutch lever 120 and holds it tightly in a retracted position where the clutch is disengaged.

In use, when the operator is slowing down and stopping at stop light, train crossing or other situation that requires the operator to wait for an extended period of time, the operator grasps the clutch lever 120 with their left hand and pulls the clutch lever 120 all the way in thereby disengaging the clutch. Next, the operator grasps the thumb latch 136 with their thumb and rotates it from a fully down position (a fully disengaged position) where the upper stop surface 182 is in engagement with the upper face 166 of step 162 of interior collar 132, in a clockwise direction until the thumb latch 136 is in a fully sideways position (a fully engaged position) where the side stop surface 188 is in engagement with the upper face 166 of step 162 of interior collar 132 and the lower surface 192 of recess 190 is in engagement with side 168 of interior collar 132. In doing so, the operator has moved the clutch catch 144 from sideways position where it does not interfere with the clutch lever 120 to an upward or vertical position where the clutch catch 144 is now position outward of the clutch lever 120 and is in engagement with the clutch lever 120 thereby holding it in a retracted position.

Once the system 110 is engaged, and the thumb latch 136 and is in a sideways position and the clutch catch 144 is in a vertical position the clutch lever 120 is held in a retract position and the operator can release their grip on the clutch lever 120 and use their left hand for anything they desire.

Once the operator is ready to drive away again, the operator simply re-grasps the clutch lever 120 and pulls it close to the handle bar 114 and/or grip 116 thereby releasing the pressure on the clutch catch 144. Once the clutch lever 120 is in the operator's control the operator grasps the thumb latch 136 with their thumb and rotates it from a sideways position (a fully engaged position) the side stop surface 188 is in engagement with the upper face 166 of step 162 of interior collar 132 and the lower surface 192 of recess 190 is in engagement with side 68 of interior collar 132 in a counterclockwise direction to a fully vertical position (a fully disengaged position) where the upper stop surface 182 is in engagement with the upper face 166 of step 162 of interior collar 132. In doing so, the operator has moved the clutch catch 144 from a vertical position where it interferes with the clutch lever 120 to a sideways position where the clutch catch 144 is now out of the way of the clutch lever 120. Once in thumb latch 136 and clutch catch 144 is in this position, the operator can again resume operation of the motorcycle 114.

This use of system 110 allows an operator to hold the clutch lever 120 in a retracted position without having to dedicate their left hand to doing so. This obviates the need to shift out first gear and this allows the user to accelerate faster as they do not have to shift before releasing the clutch.

Detents: To provide an added level of protection, detents can be used to maintain the system in either or both of the disengaged position and the engaged position. In one arrangement, a detent 208 is placed within the exterior surface of clutch lever 120. This detent 208 is a simple recess in the exterior surface of clutch lever 120 that is sized and shaped to receive clutch catch 144 therein when clutch catch 144 is in a fully engaged position. This detent 208 helps to hold the clutch catch 144 within the detent 208 when it is engaged thereby improving the safety of the system 110.

In another arrangement a detent recess 210 is positioned in one or both of the upper stop surface 182 and the side stop surface 186. In corresponding fashion, a detent pin 212 biased by a detent spring 214 is positioned in the downward facing surface of upper face 166 of step 162 of interior collar 132. When thumb latch 136 is in a fully disengaged position, detent pin 212 is forced within detent recess 210 within the upper stop surface 182, thereby helping to hold the system 110 in the fully disengaged position. When thumb latch 136 is in a fully engaged position, detent pin 212 is forced within detent recess 210 within the side stop surface 188, thereby helping to hold the system 110 in the fully engaged position. To shift between the fully engaged position and the fully disengaged position, the operator must overcome the spring bias force of the detent spring 214 and the friction formed between detent pin 212 and thumb latch 136.

Similarly, a detent spring 214, and detent recess 210 and detent pin 212 may be placed in the clutch catch 144 in similar fashion with similar effect.

From the above discussion it will be appreciated that the clutch assistance system and method of use is presented herein improves upon the state of the art.

Specifically, the a clutch assistance system and method of use: improves upon the state of the art; improves safety; reduces operator fatigue; improves the comfort of operation; eliminates the need to hold the clutch in while waiting; is relatively fool proof; allows for faster acceleration after a stop light changes; is relatively inexpensive; is simple to use; can be installed on practically any motorcycle or other power sport vehicle; is adjustable; is easy to manufacture; reduces or eliminates the wait time needed to shift gears; has a robust design; improves the efficiency of riding; can be used on a wide variety of motorcycles and power sport systems; has a long useful life; has a small footprint; is high quality; is durable; does not interfere with the operator or other operations of the motorcycle or power sport system; can be quickly installed; can be easily installed; can be quickly removed; can be easily removed; is adjustable; securely holds the clutch lever in; does not require substantial modification of the motorcycle or power sport system for use; can be installed without permanent alterations to the motorcycle or power sport system; can be installed with conventional tools, among countless other advantages and improvements.

It will be appreciated by those skilled in the art that other various modifications could be made to the device without parting from the spirit and scope of this invention. All such modifications and changes fall within the scope of the claims and are intended to be covered thereby.

What is claimed is:

1. A motorcycle lever retention device to hold a motorcycle lever in a secured position when engaged and to allow free movement of the motorcycle lever when not engaged, the device comprising:
   a clamp secured to a motorcycle handlebar, the clamp including an extended portion, the extended portion including a channel and the channel including a notch;
   a slider including:
      a thumb extension;
      a lever retention extension having a lever retention extension first position and a lever retention extension second position, and wherein the lever retention, extension includes a restraining hook;
      a rail in between the thumb extension and the lever retention extension, the rail having a front end and a rear end; and wherein the rail is slidably secured in the channel to travel in a circumferential direction about the handlebar; and
   wherein the slider has:
      a slider first position about the clamp wherein the rail is not engaged by the notch and the lever retention extension is in the lever retention extension first position wherein the motorcycle lever is not engaged by the device; and
      a slider second position about the clamp wherein the rail is engaged by the notch and the lever retention extension is extended to the lever retention extension second position to retain the motorcycle lever in the secured position; and
   a spring secured between the slider and the clamp, the spring having a first length at the slider first position and a second length in the slider second position.

2. The motorcycle lever retention device of claim 1 further comprising an insert between the slider and the motorcycle handlebar.

3. The motorcycle lever retention device of claim 1 further comprising an addition to the lever retention extension, the addition extending between the lever retention extension and the lever when the slider is in the slider second position.

4. The motorcycle lever retention device of claim 1 wherein the clamp includes a first half and a second half.

5. The motorcycle lever retention device of claim 4 wherein the claim half is secured to the claim second half with a screw.

6. The motorcycle lever of claim 1 wherein the clamp is an adjustable clamp.

7. The motorcycle lever of claim 1 wherein the slider includes two rails, one on a slider first side and another on a slider second side.

8. A lever retention device to hold a handlebar lever in a secured position when engaged and to allow free movement of the lever when not engaged, the device comprising:
   a clamp secured to a handlebar, the clamp including an extended portion, the extended portion including a channel and the channel including a notch; and
   a slider including:
      a thumb extension;
      a lever retention extension having a lever retention extension first position and a lever retention extension second position, and wherein the lever retention extension includes a restraining hook;
      a rail in between the thumb extension and the lever retention extension, the rail having a front end and a rear end; and wherein the rail is slidably secured in the channel to travel in a circumferential direction about the handlebar; and
   wherein the slider has:
      a slider first position about the clamp wherein the rail is not engaged by the notch and the lever retention extension is in the lever retention extension first position wherein the handlebar lever is not engaged by the device; and
      a slider second position about the clamp wherein the rail is engaged by the notch and the lever retention extension is extended to the lever retention extension second position to retain the handlebar lever in the secured position.

9. The lever retention device of claim 8 further comprising an insert between the slider and the handlebar.

10. The lever retention device of claim 8 further comprising an addition to the lever retention extension, the addition extending between the lever retention extension and the lever when the slider is in the slider second position.

11. The lever retention device of claim 8 wherein the clamp includes a first half and a second half.

12. The lever retention device of claim 11 wherein the clamp first half is secured to the clamp second half with a screw.

13. The lever of claim 8 wherein the clamp is an adjustable clamp.

14. The lever of claim 8 further including a slider solenoid.

15. A clutch assistance system, connected to a power sport device having a handle-bar and a clutch lever, comprising:
   a collar;
   the collar connected to the handle-bar adjacent the clutch lever, the handle-bar having a handlebar axis;

a thumb latch rotatably connected to the collar, the thumb latch having a thumb latch rotation axis and wherein the thumb latch rotation axis is not parallel to the handle bar axis;
a clutch catch connected to the thumb latch;
wherein when the thumb latch is rotated the clutch catch is also rotated;
wherein the thumb latch and clutch catch rotate between a disengaged position wherein the clutch catch does not interfere with the clutch lever, and an engaged position wherein the clutch catch holds the clutch lever in a retracted position.

16. The system of claim 15 wherein the collar is formed of an interior collar and an exterior collar that connect together at a seamline around the handle-bar.

17. The system of claim 15 wherein the collar has an interior surface that forms a generally circular shape.

18. The system of claim 15 wherein the collar includes a shaft positioned above the handlebar axis on the collar, wherein the shaft tightens opposing halves of the collar together.

19. The system of claim 15 wherein the collar includes a shaft positioned below the handlebar axis, wherein the shaft tightens opposing halves of the collar together.

\* \* \* \* \*